United States Patent
Negri et al.

(10) Patent No.: US 11,685,374 B2
(45) Date of Patent: Jun. 27, 2023

(54) INCHING SYSTEM FOR A CONSTRUCTION VEHICLE

(71) Applicant: CNH Industrial America LLC, New Holland, PA (US)

(72) Inventors: Gianpiero Negri, Mercato San Severino (IT); Antonio Oddo, Turin (IT); Alessandro Benevelli, Reggio nell'Emilia (IT); Adriano Garramone, Lecce (IT); Mario Girardi, Lecce (IT); Giovanni Notarnicola, Putignano (IT); Andrea Gravili, Lecce (IT)

(73) Assignee: CNH Industrial America LLC, New Holland, PA (US)

( * ) Notice: Subject to any disclaimer, the term of this patent is extended or adjusted under 35 U.S.C. 154(b) by 548 days.

(21) Appl. No.: 16/630,777

(22) PCT Filed: Jul. 12, 2018

(86) PCT No.: PCT/EP2018/068881
§ 371 (c)(1),
(2) Date: Jan. 13, 2020

(87) PCT Pub. No.: WO2019/012023
PCT Pub. Date: Jan. 17, 2019

(65) Prior Publication Data
US 2021/0078579 A1   Mar. 18, 2021

(30) Foreign Application Priority Data
Jul. 13, 2017   (IT) .................. 102017000078668

(51) Int. Cl.
*B60W 10/103*   (2012.01)
*B60W 30/18*    (2012.01)
*B60W 10/184*   (2012.01)

(52) U.S. Cl.
CPC .... *B60W 30/18063* (2013.01); *B60W 10/103* (2013.01); *B60W 10/184* (2013.01);
(Continued)

(58) Field of Classification Search
CPC .......... B60W 30/18063; B60W 10/03; B60W 10/184; B60W 230/17; B60W 2510/0638;
(Continued)

(56) References Cited

U.S. PATENT DOCUMENTS

| 4,006,805 A | 2/1977 | Zeller et al. |
| 5,040,648 A | 8/1991 | Mitchell et al. |

(Continued)

FOREIGN PATENT DOCUMENTS

| CN | 1865055 A | 11/2006 | |
| DE | 102013220919 A1 * | 4/2015 | ...... B60W 30/18118 |

(Continued)

OTHER PUBLICATIONS

International Search Report and Written Opinion for PCT/EP2018/068881 dated Oct. 17, 2018 (11 pages).

*Primary Examiner* — Roger L Pang
(74) *Attorney, Agent, or Firm* — Peter Zacharias (57) ABSTRACT

An inching system for a vehicle having a hydrostatic transmission and an engine that drives the transmission. The transmission has a pilot pressure port with a pressure of hydraulic fluid at the pilot pressure port controlling a level of power from the transmission, a beginning of draining of the hydraulic fluid from the pilot pressure port defining an inching starting point. The system includes a brake pedal and an electrohydraulic valve coupled to the pilot pressure port of the transmission, the valve being configured to drain the hydraulic fluid at the pilot pressure port. A sensor is coupled to the pedal to detect an input from the operator, the sensor producing a signal indicative of the input from the (Continued)

operator. A controller receives the signal and a speed of the engine. The controller controls the electrohydraulic valve dependent upon the signal and the engine speed so that the inching starting point is unchanged regardless of the speed of the engine.

15 Claims, 6 Drawing Sheets

(52) U.S. Cl.
CPC . *B60W 2300/17* (2013.01); *B60W 2510/0638* (2013.01); *B60W 2510/18* (2013.01); *B60W 2540/12* (2013.01); *B60W 2710/1083* (2013.01); *B60W 2710/18* (2013.01); *B60Y 2200/415* (2013.01); *B60Y 2300/18058* (2013.01); *F16H 2312/06* (2013.01)

(58) Field of Classification Search
CPC ......... B60W 2510/18; B60W 2540/12; B60W 2710/1083; B60W 2710/18; B60W 2510/182; F16H 2312/06; E02F 9/225; E02F 9/228
See application file for complete search history.

(56) References Cited

U.S. PATENT DOCUMENTS

| | | | |
|---|---|---|---|
| 5,918,509 A | | 7/1999 | Heilig et al. |
| 5,947,242 A | | 9/1999 | Creger |
| 6,135,580 A | | 10/2000 | Denning |
| 8,855,871 B2* | | 10/2014 | Onodera ............... F16H 61/431 60/449 |
| 2002/0082138 A1 | | 6/2002 | Cannon et al. |
| 2005/0284719 A1 | | 12/2005 | Kuhner et al. |
| 2009/0320462 A1* | | 12/2009 | Ohtsukasa ............ F16H 61/472 60/431 |
| 2015/0033718 A1* | | 2/2015 | Kaneko .................. F16H 61/47 60/431 |

FOREIGN PATENT DOCUMENTS

| | | |
|---|---|---|
| DE | 112013000267 T5 | 8/2015 |
| EP | 2667061 A1 | 11/2013 |
| FR | 2485998 A1 | 1/1982 |
| WO | 96/32300 A1 | 10/1996 |
| WO | 99/52734 A1 | 10/1999 |
| WO | 2014/011173 A1 | 1/2014 |

\* cited by examiner

INCHING SYSTEM FOR A CONSTRUCTION VEHICLE

BACKGROUND OF THE INVENTION

The present invention relates to an inching system for controlling the speed of a construction vehicle.

A material handling machine such as a front-end loader used in agricultural, construction or earth-moving industries typically includes a hydraulically operated lift arm structure connected thereto. The lift arm structure is associated with a front bucket and also includes either a single of a pair of load-lifting arms, which are connected to the frame.

A wheeled loader is commonly used to load and move substantial volumes of dirt and like material from one location to another. A conventional wheel loader includes a relatively large frame which is supported for self-propelled movement over land by pairs of air-filled tires and has a bucket or implement mounted to one end thereof. The bucket or implement can be selectively elevated to a position above side panels on a truck or the like and can be selectively tilted to "dump" materials therefrom.

During material handling operations, varying amounts of resistance to movement are encountered including relatively high resistance when a heavy load is being gathered into the bucket. As the bucket encounters the material and as the bucket is lifted the engine RPMs are often increased to maximize the hydraulic pressure and hence the lifting force. While this cycle is proceeding it is often desirable to move the machine forward at a slow small controlled pace. This has been accomplished by using an inching valve that moderates the amount of hydraulic pressure and flow that is used to drive the wheels.

A problem with this method is that as the engine speed or revolutions per minute (RPMs) vary, so does the force that drives the wheels.

What is needed in the art is a control system that allows the vehicle to inch along in a repeatable efficient manner.

SUMMARY OF THE INVENTION

The present invention provides an inching function to a wheeled loader vehicle controllable by use of the brake pedal.

The invention in one form is directed to an inching system for a wheeled loading vehicle having a hydrostatic transmission and an engine that drives a hydraulic pump within the transmission, the transmission providing power to the wheels. The transmission has a pilot pressure port with a pressure of hydraulic fluid at the pilot pressure port controlling a level of the rotational power from the transmission, a beginning of draining of the hydraulic fluid from the pilot pressure port defining an inching starting point. The system including a brake pedal operable by an operator to activate brakes of the vehicle; and an electrohydraulic valve coupled to the pilot pressure port of the transmission, the valve being configured to drain the hydraulic fluid at the pilot pressure port. A sensor is coupled to the brake pedal to detect an input from the operator, the sensor producing a signal indicative of the input from the operator. A controller receives the signal and a speed of the engine. The controller being further configured to control the electrohydraulic valve dependent upon the signal and the engine speed so that the inching starting point is unchanged regardless of the speed of the engine.

In another embodiment of the invention the valve is an electro-hydraulic control valve, the controller being configured to vary an electric current to the valve that is dependent upon the speed of the engine.

In a further embodiment the input from the operator is a pressure in brake fluid associated with the brake pedal and/or a position of the brake pedal.

In yet another embodiment the controller uses the signal to control the electrohydraulic valve to reduce a fluid pressure at the pilot pressure port over a selected range of movement of the brake pedal.

In still yet another embodiment the controller controls the fluid pressure at the pilot pressure port so that the inching starting point repeatedly occurs at a set operator input.

In still yet another embodiment the sensor is a position sensor sensing an angular movement of the brake pedal.

In still yet another embodiment the sensor is a position sensor sensing a displacement movement of the brake pedal.

In still yet another embodiment the pressure sensor senses the hydraulic pressure of the braking system as applied by an operator depressing the brake pedal.

In still yet another embodiment the controller is configured to fully open the valve when the sensor detects a movement of the brake pedal beyond a preselected value and service brakes are engaged by the brake pedal as the movement of the brake pedal exceeds the preselected value.

In still yet another embodiment a selected position of the brake pedal or a selected pressure applied to the brake pedal repeatedly results in a predetermined amount of torque to the wheels from the hydrostatic transmission.

In still yet another embodiment the controller is further configured to control the valve dependent upon the signal when the signal indicates that at least a preselected first pressure is applied to the brake actuator interface, without service brakes being engaged.

In still yet another embodiment the controller is further configured to stop controlling the valve at an inching ending point dependent upon the signal when the signal indicates that at least a preselected second pressure is applied to the brake actuator interface, the second pressure being higher than the first pressure.

In still yet another embodiment the controller is further configured to control the valve dependent upon the signal when the signal indicates that the brake actuator interface is at least at a preselected first position without engaging the service brakes.

In still yet another embodiment the controller is further configured to stop controlling the valve at an inching ending point dependent upon the signal when the signal indicates that the brake actuator interface is at least at a preselected second position, the second position reflecting a further movement of the brake actuator interface than the first position.

In still yet another embodiment the vehicle is a work vehicle.

An advantage of the present invention is that engine RPM is independent of the inching function.

Another advantage is that the present invention does away with an inching valve that did not control the speed of the vehicle as the present invention does.

A further advantage is that the repeatable control of the inching function is independent of hydraulic pressure changes of the pump driven by the engine.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "fore", "aft", "left" and "right", when used in connection with the wheeled loader and/or components thereof are usually determined with reference to the direction of forward operative travel of the loader, but they should not be construed as limiting. The terms "longitudinal" and "transverse" are determined with reference to the fore-and-aft direction of the work vehicle and are equally not to be construed as limiting.

Figure 1:
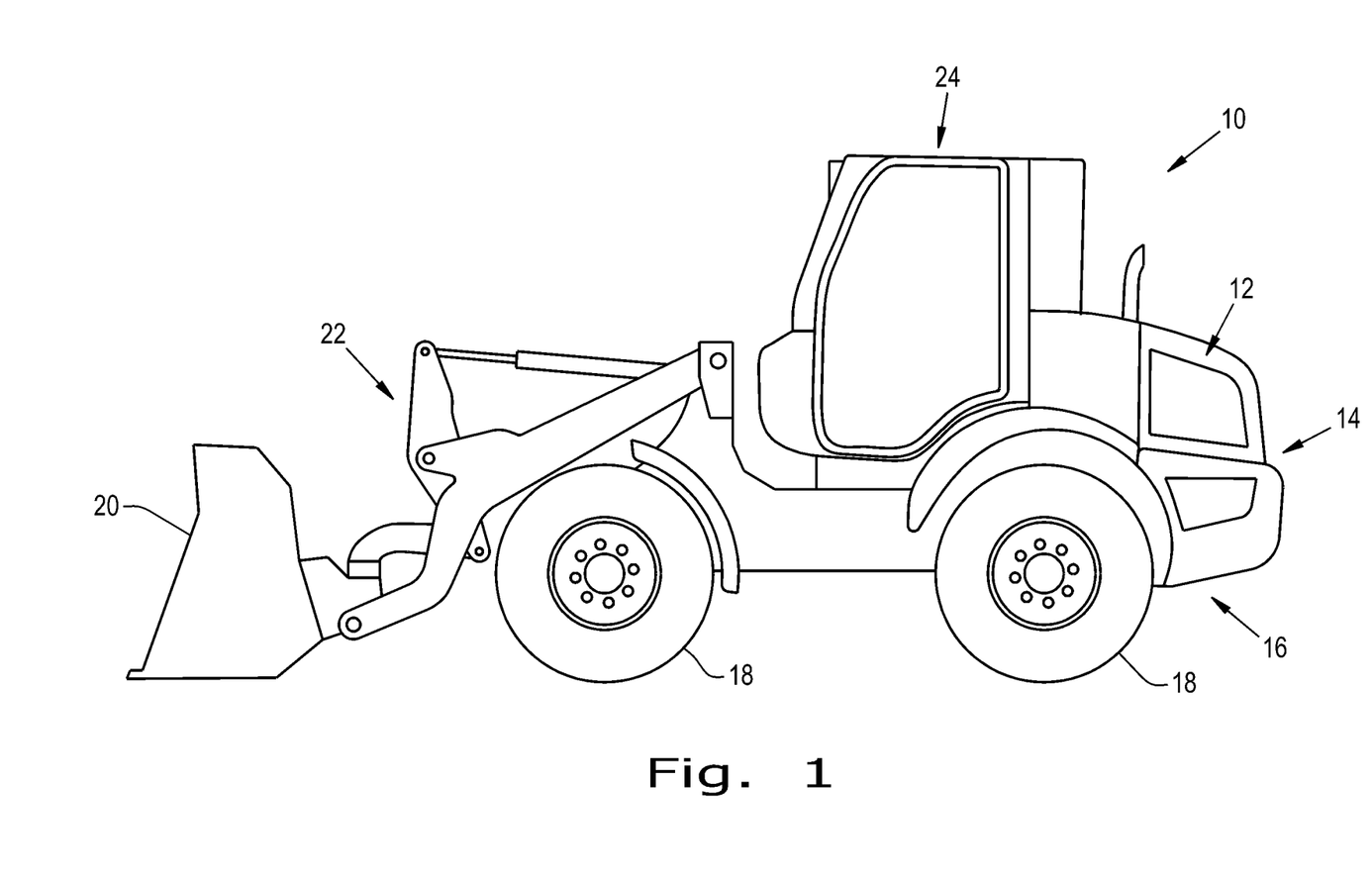
FIG. 1 is a side view of an embodiment of a construction vehicle in the form of a compact wheeled loader, which includes an embodiment of an inching system of the present invention.

Referring now to the drawings, and more particularly to FIG. 1, there is shown an exemplary embodiment of a work vehicle 10 in the form of a wheeled loader 10 having an engine 12, a hydraulic pump 14, a hydrostatic transmission 16, wheels 18, a bucket 20, lift arms 22 and a cab 24. The engine 12 drives the hydraulic pump 14 that produces pressurized hydraulic fluid to provide power to various systems of the wheeled loader 10. Hydraulic fluid from hydraulic pump 12 is used to power the hydrostatic transmission 16 to drive the wheels 18. Wheels 18 are ground engaging devices 18, which can also include tracks or other devices that engage the ground to provide motive force for vehicle 10.

Figure 2:
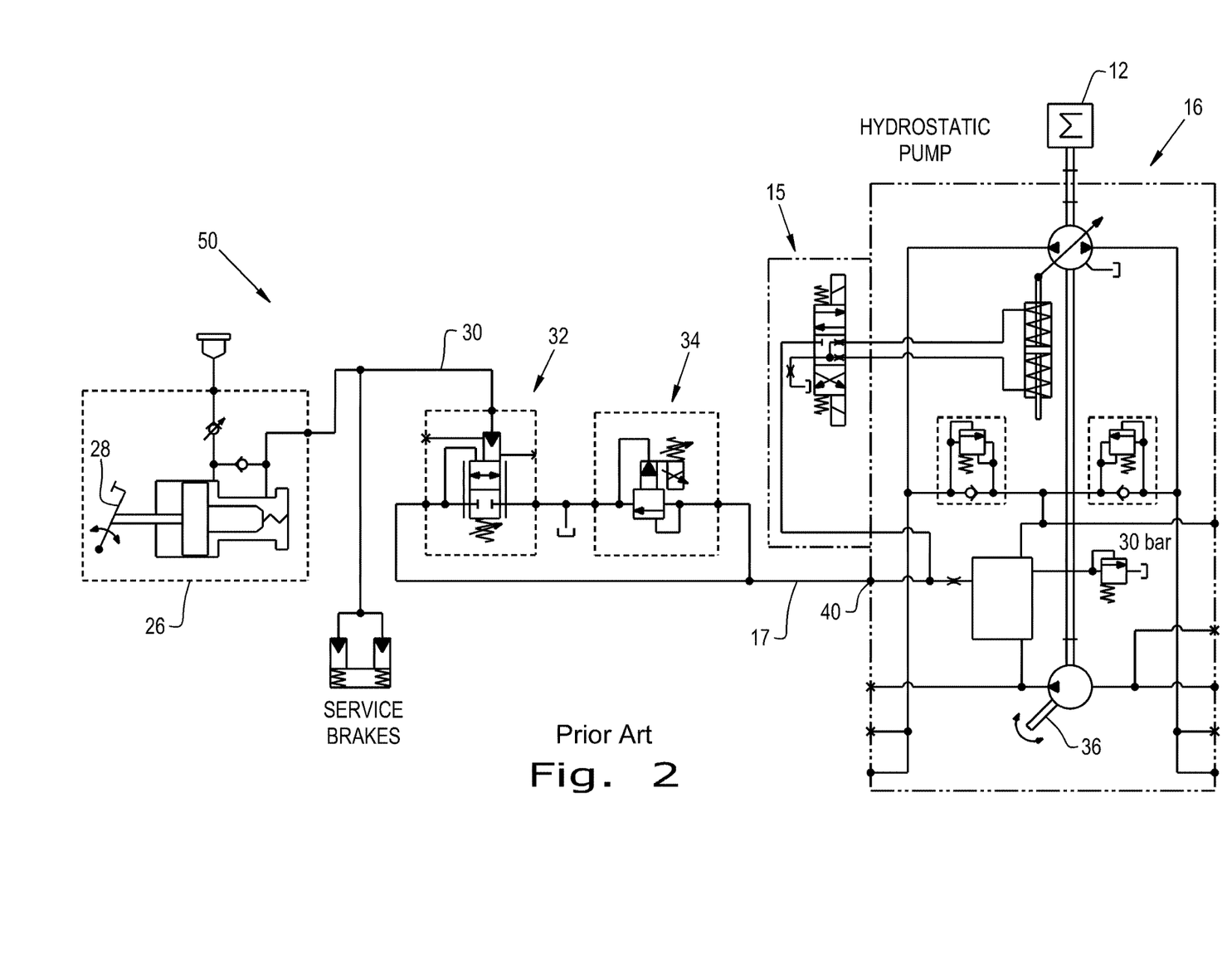
FIG. 2 is a schematic view of a prior art inching system.

Now, additionally referring to FIG. 2, there is shown a prior art inching system 50 having a brake actuator interface 26 with a brake pedal 28, a brake fluid line 30, an inching valve 32, and an electro-hydraulic (EH) valve 34. Pressure on the brake pedal 28 alters the pressure in the brake fluid line 30, which alters inching valve 32 to thereby control a fluid flow to the hydrostatic transmission 16 to alter the torque output on a shaft 36 that drives ground engaging devices 18 in a fore or aft direction. The inching system 50 suffers from the fact that the hydraulic pressure/flow can vary depending on the output of hydraulic pump 14 as the RPM of the engine 12 may change by changes in a throttle setting or load on the engine 12, which in turn causes the input to the hydrostatic transmission 16, by way of the inching valve 32, to vary thereby altering the torque output of the shaft 36. In this prior art system the throttle pedal controls the engine RPMs and this in turn drives the hydraulic pump, variations of which alter a hydraulic pilot pressure for the hydrostatic transmission 16.

A valve 15 is a forward/neutral/reverse valve (shown in the neutral position) for selecting a direction of rotation of the output of the hydrostatic transmission 16. A hydraulic line 17 is coupled to the pilot to control the pilot pressure, which controls a swash plate in the hydrostatic transmission 16 and thus the output torque delivered on the shaft 36. When the valve 15 is placed into a forward or reverse position the fluid flow therethrough is proportional to the pressure from the hydraulic pump, which in turn depends on the engine RPM, which is operating at a level set by the throttle. Hydraulic line 17 allows for the pilot pressure to be modified, which alters an angle of the swash plate and the power conveyed to the shaft 36. The swash plate angle is adjusted through this action so that the instantaneous pump output flow is exactly enough to maintain a designated pressure. If the load flow increases, pressure will momentarily decrease but a pressure-compensation valve will sense the decrease and then increase the swash plate angle to increase pump output flow so that the desired pressure is restored. A problem with this prior art system is that inching response changes as the engine RPM changes so that an operator does not have a repeated experience when using the prior art system. For example, the use of the brake pedal requires a differing position to get the same effect if the engine is now at a different speed than a previous use of the brake pedal by the operator. This system introduces lack of comfort and lack of repeatability issues that are a problem with the prior art.

Figure 3:
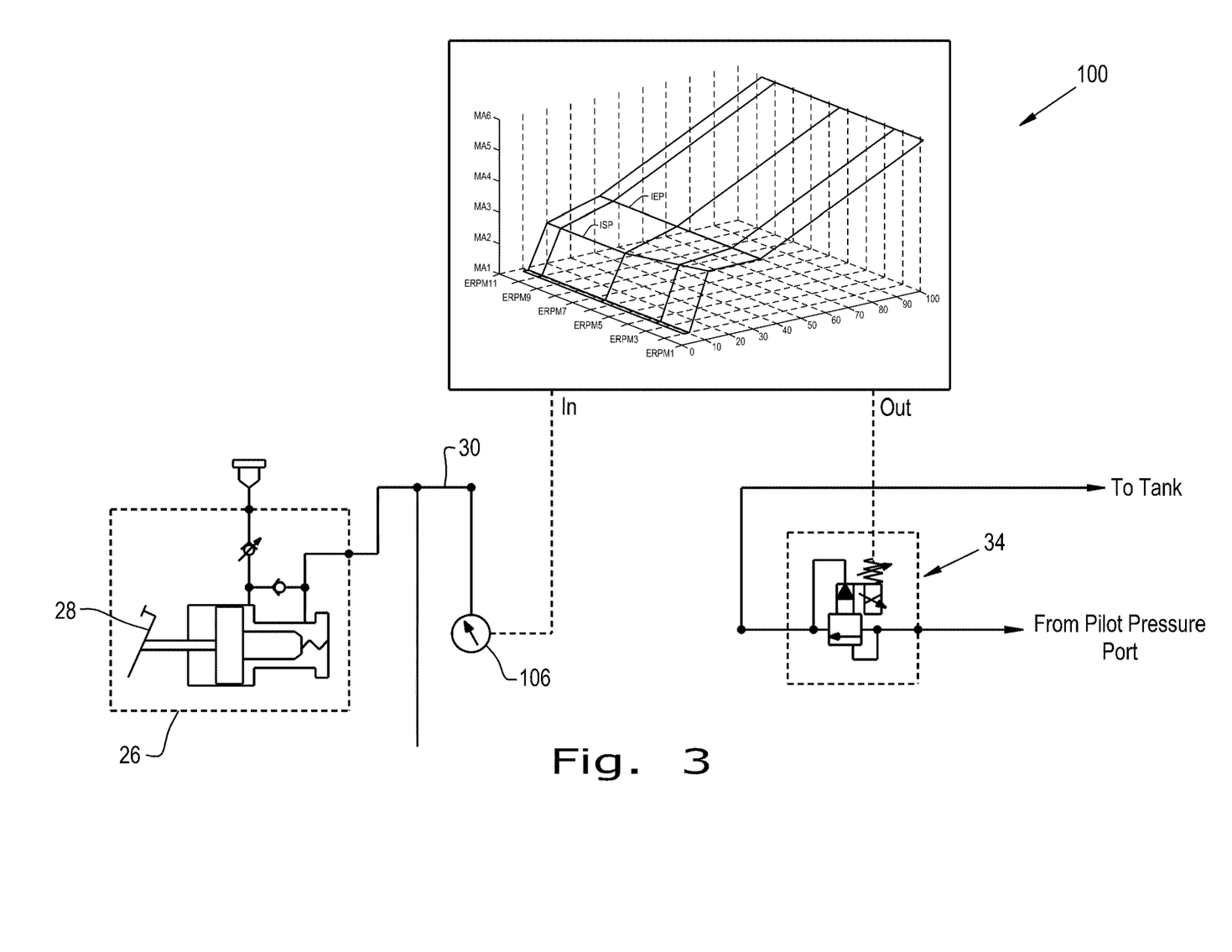
FIG. 3 is a schematic view of an embodiment of the inching system of the present invention.
Figure 4:
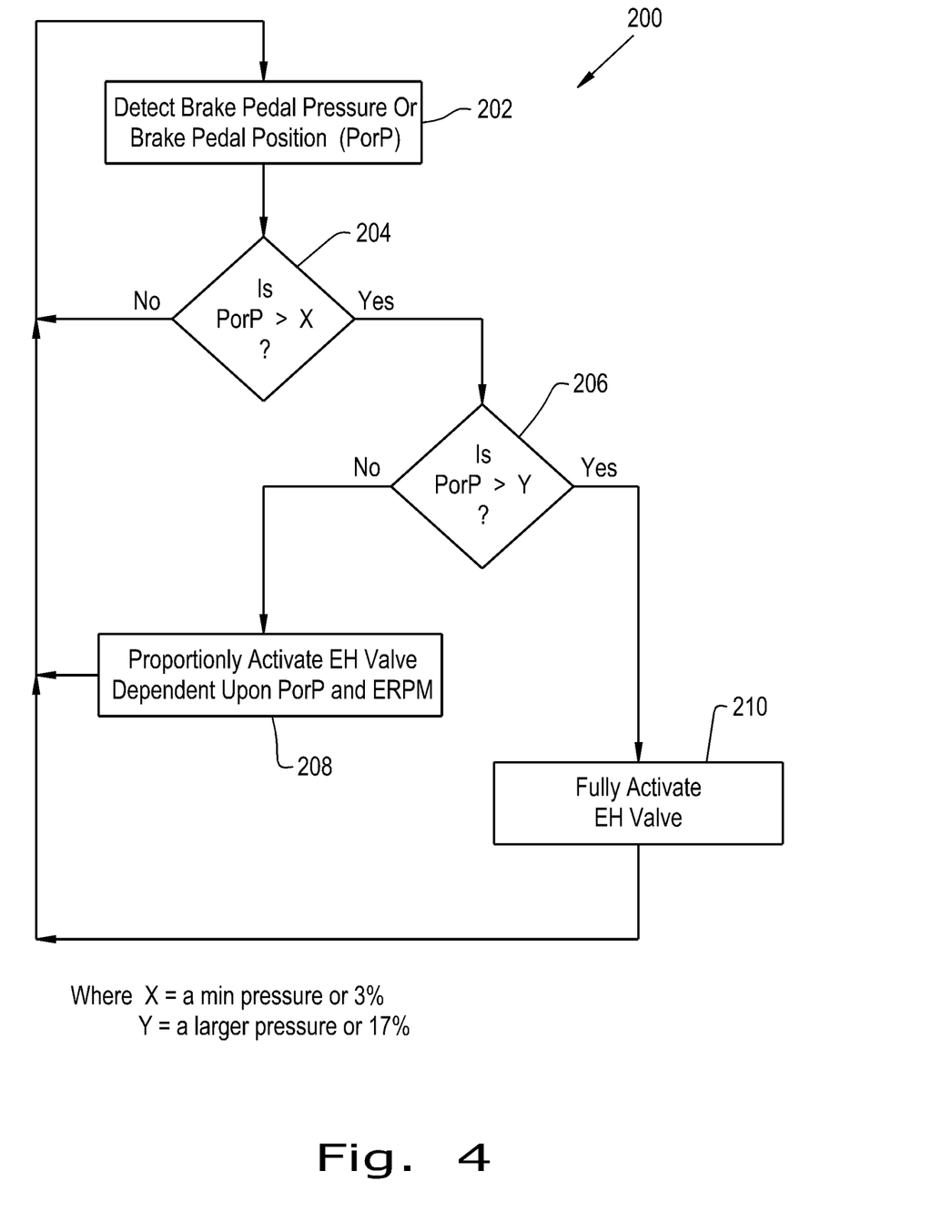
FIG. 4 is a flowchart of steps carried out by the inching system of FIGS. 1, and 3.
Figure 5:
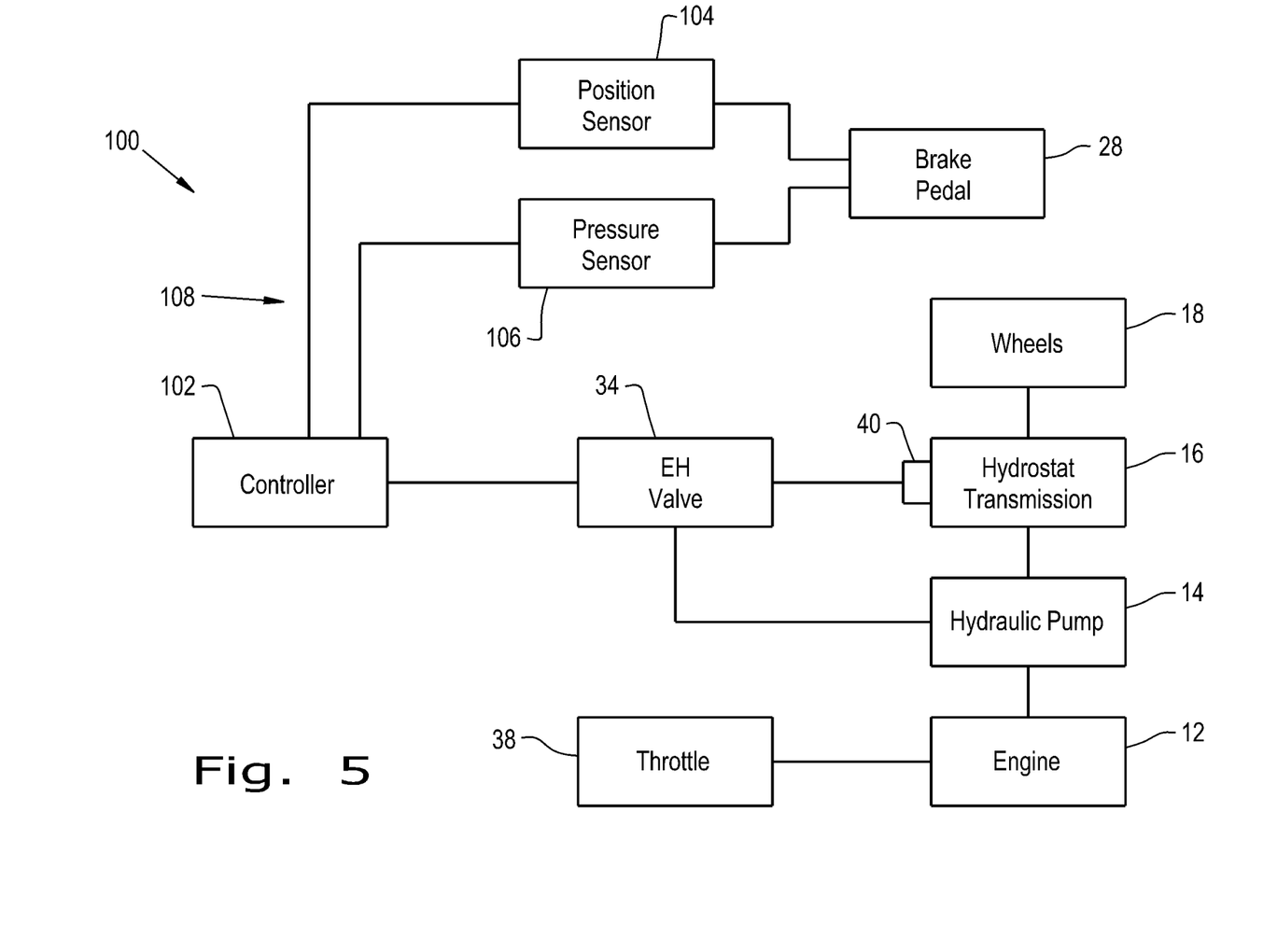
FIG. 5 is a block diagram that illustrates some interconnections of the elements of the present invention.

Now, additionally referring to FIGS. 3-5 there is shown an exemplary embodiment of an inching system 100 of the present invention. The inching system 100 includes a controller 102, a positon sensor 104, and a pressure sensor 106, which are configured to carry out the inventive steps of a method 200. The controller 102 is coupled to the position sensor 104 and/or the pressure sensor 106. The present invention allows the controller 102 to carry out the functions of method 200 by receiving a signal 108 that is conveyed to the controller 102 by either measuring a pressure of the brake fluid in the brake fluid line 30 using the pressure sensor 106 or the position of the brake pedal 28 using the position sensor 104. The signal 108 can be thought of as being representative of a position of the brake actuator interface 26 or the brake pedal 28, or more broadly an input from the operator as the operator depresses the brake pedal 28. As the position of the brake pedal 28 changes, the controller 102 alters a signal to the EH valve 34 that drains a flow or otherwise effectively reduces pressure at the pilot pressure port 40 of the hydrostatic transmission 16 to thereby control the amount of torque applied to the shaft 36. In this way the torque applied to the ground engaging devices 18 is entirely related to the relative position of the brake pedal 28 so that the vehicle 10 can inch along in an efficient manner without regard to the RPM of the engine 12 or variations thereto, such as by changes in a position of a throttle 38. It should be noted that although both a pressure sensor 106 and a positon sensor 104 are illustrated that the inventive method 200 can use one or the other or both. It is also contemplated that the some other sensor may be used to provide the signal 108.

Figure 6:
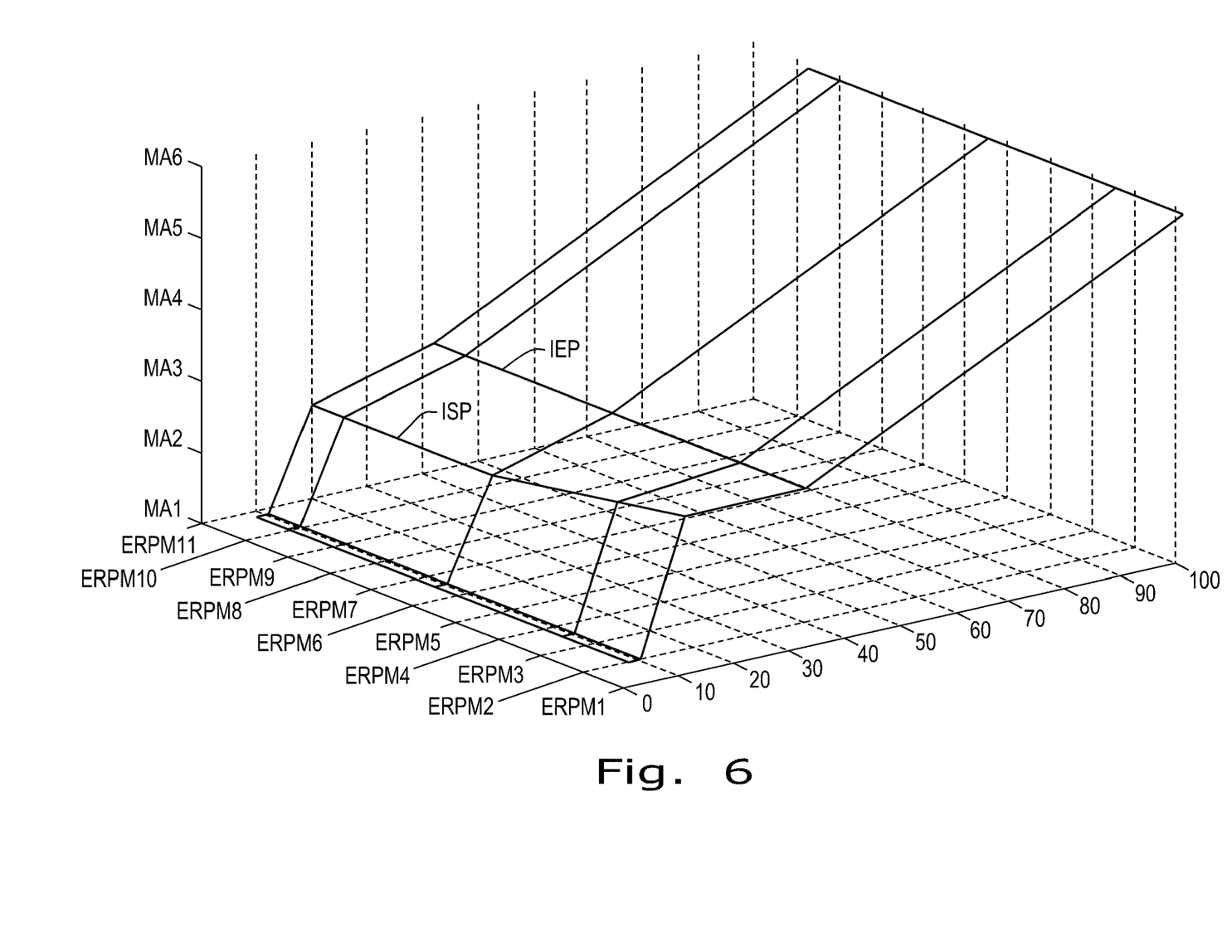
FIG. 6 is a graphical illustration of the control provided by the inventive embodiment of the present invention.

Looking to the chart supplied in FIG. 3, which is shown in more detail in FIG. 6 as pressure in the brake circuit increases (or the position of the brake pedal 28) the piloting pressure at the pilot pressure port 40 decreases across the representative range as a result of the increasing electrical current that is supplied to EH valve 34. The fluid pressure controlled at the pilot pressure port 40 may be substantially linear over selected ranges of speed of the engine 12, which of course directly controls the torque supplied to the shaft 36. Method 200 illustrates the steps taken by the controller 102 in carrying out this method of the exemplary invention. At step 202 the operator input, as exemplified by the position of the brake pedal 28, is detected as a result of the signal 108 coming from either the positon sensor 104 or the pressure sensor 106. This ensures that the controlling aspect of the present invention is supplied by an operator's activation of the brake pedal 28 and that it is the relative position of the brake pedal 28 that is being related to the controller 102 by way of the signal 108, so that a repeatable amount of torque is applied to the wheels 18 relative to the position of the brake pedal 28.

If the Pressure or the Position (PorP) is greater than X, which is a predetermined or preselected minimum amount of force or a minimum movement of the travel of the brake pedal 28, as determined at step 204, then method 200 proceeds to step 206. As can be seen an inching starting point ISP occurs at the same brake pedal 28 position X across the entire range of speeds of the engine 12. The inching starting point ISP begins as EH valve 34 is activated sufficiently to start a draining of the hydraulic fluid at the pilot pressure port 40. It can also be noted that an inching ending point IEP occurs at the same brake pedal 28 position Y. Controller 102 controls the draining of fluid pressure at the pilot pressure port 40 so that the inching starting point ISP repeatedly occurs at the selected operator input X.

At step 206 the PorP is tested to see if it is more or less than Y, which is a larger force, or a further angular position of the brake pedal 28, or percentage of the total travel of the brake pedal 28. If PorP is less than (or equal to) Y then the activation of the EH valve 34 takes place, at step 208, substantially as illustrated in the chart of FIG. 3, where a proportional change in the pilot pressure supplied to the pilot pressure port 40 is output dependent upon, as depicted here, the fluid pressure in the brake fluid line 30, where the pressure ranges from, for purposes of an example, from 0 bar to 30 bar. The change on the fluid pressure in the brake fluid line 30 may correspond to the change of position or of force on the brake pedal 28, previously discussed.

If PorP is greater than Y, then method 200 proceeds to step 210, in which case the EH valve 34 is fully activated, at step 210. After the PorP exceeds Y the service brakes of the vehicle 10 are used to brake the vehicle 10 in a conventional manner. While method 200 is controlling the inching function when PorP is between X and Y the service brakes are not engaged so that they do not interfere with the inching function of method 200. The application of the service brakes takes place due to the inherent pressure in the brake fluid line 30, but it is also contemplated that the information from sensors 104 and/or 106 could be used by the controller 102 to provide a braking function of the vehicle 10.

The present inching system 100 is all about being able to rev the engine 12 (with the throttle pedal 38) so that the hydraulic circuit is charged to a desired (often maximum) pressure for hydraulic consumers (e.g. lift cylinder of lift arms 22), nevertheless controlling the vehicle speed (generally in a forward direction when loading) with the brake pedal 28. Because there is a direct link between the engine 12 and the pump 14 that drives the hydrostatic drive 16, with the pump 14 of the hydraulic circuit revving this increases pressure in the hydraulic circuit and would tend to increase vehicle speed, yet advantageously the present invention controls the speed of vehicle 10 independent of the increased hydraulic pressure.

Now, additionally referring to FIG. 6, there is illustrated, in a graphical form, the results of the execution of method 200. Along the right axis the numbers 0-100 represent a percentage of the movement of brake pedal 28 over a range of a total movement range of the brake pedal 28. The ERPM1-ERPM11 represent 11 different RPM levels of the engine 12. The MA1-MA6 values represent milliamp values of an electric current that is supplied to the EH valve 34 for the opening of the EH valve 34 to control or reduce a pressure in the pilot pressure port 40. As can be seen in FIG. 6 the method 200 starts supplying a current to the EH valve 34 when the brake pedal is at a preselected position of X, which corresponds to the inching starting point ISP. This is the starting point of inching that is independent of the RPMs of the engine 12. The increase in milliamps to the EH valve 34 occurs as the brake pedal 28 is further depressed toward position or pressure Y. Note that change in the milliamp level increases at different rates depending upon the operating level of the ERPM1-ERPM11. This is carried out so that the experience of the operator in the operation of the vehicle 10, as the brake pedal 28 is depressed, is the same independent of the engine 12 speed.

For example, when looking at FIG. 6, take the ERPM4 line, which has been effectively selected by the operator using the throttle pedal by holding it in a selected position, and when, not touching the brake pedal 28, the vehicle 10 will move at an average speed relative to this selection. Then, when touching the brake pedal 28, at a 2% deflection nothing will happen because the milliamp level MA1 that is sent to the EH valve 34 will not open the EH valve 34. However, when braking at a level X pedal deflection (see step 204), the inching function is carried out because the milliamp level of more that MA1, but less than MA2, is sent to the EH valve 34, which will start to have effect. For purposes of discussion this is the inching start point ISP. When deflecting the brake pedal at level Y deflection (see step 206) the inching will be completed at the inching ending point IEP in that the EH valve 34 is completely open and drains the pilot pressure completely.

Now consider the condition form a prior art perspective:
When driving at 2200 rpm (high vehicle speed)
Because of the higher engine rpm the minimum current that opens the EH valve is different.
So, the inching start point may begin at 3% brake pedal deflection instead of 8% at a different engine RPM, while the inching end point is still 15%.
The prior art design could not solve this variation in inching start points.

With the present invention a 3D map (See FIG. 6) of the relation between the brake pedal 28 and the milliamp requirement for the EH valve 34 for each engine RPM is known, with this relationship being illustrated in FIG. 6. Further, when depressing the brake pedal beyond the Y point (again see step 206), then the EH valve 34 is completely open over the entire range of engine RPM (see step 210) and the normal action of the service brakes take over. The inventive solution of the present invention also accounts for the normal braking to take place when the brake pedal deflection is outside that of the inching method 200, to avoid having the service brakes working against the inching function.

It is contemplated that, for every type of wheel loader a different 3D map can be provided. It is also contemplated that a number of 3D maps for a single type of wheel loader can be provided so that the inching starting point ISP can be selected, to be earlier or later, by adjusting the predetermined value X. It is further contemplated that the inching zone can be made steeper or shallower by changing the inching ending point IEP. This allows the use of a selection device, such as a knob in the cab 24, which could be used to select a different gradient, thereby allowing the operator to set an "aggressiveness setting" for the functioning of the inching system 100 of the present invention.

An advantage of the present invention is that engine RPM is independent of the inching function. The inching starting point ISP and inching ending point IEP (as depicted in FIG. 3 and FIG. 6) is always at the same brake pedal positions regardless of the speed of engine 12, which is achieved by way of the electronic control system 100.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An inching system for a loading vehicle having ground engaging devices, a hydrostatic transmission, brakes, and an engine, the hydrostatic transmission having hydraulic fluid, the engine configured for driving a hydraulic pump that supplies the hydraulic fluid within the hydrostatic transmission, the hydrostatic transmission configured for providing rotational power to the ground engaging devices, the hydrostatic transmission further having a pilot pressure port with a pressure of the hydraulic fluid at the pilot pressure port controlling a level of the rotational power from the hydrostatic transmission, a beginning of draining of the hydraulic fluid from the pilot pressure port defining an inching starting point, the inching system comprising:
   a brake pedal operable by an operator to activate the brakes of the loading vehicle;
   an electrohydraulic valve hydraulically coupled to the pilot pressure port of the hydrostatic transmission, the electrohydraulic valve being configured to drain the hydraulic fluid at the pilot pressure port;
   a sensor coupled to the brake pedal to detect an input from the operator, the sensor configured to produce a signal indicative of the input from the operator; and
   a controller configured to receive the signal and an engine speed of the engine, the controller being further configured to control an electric current to control the electrohydraulic valve based upon the signal and the engine speed so that the inching starting point and an inching ending point do not change as the engine speed changes, the inching ending point being defined by an ending of the draining of the hydraulic fluid from the pilot pressure port.

2. The inching system according to claim 1, wherein the controller is configured to vary the electric current based upon the engine speed.

3. The inching system according to claim 1, wherein the input from the operator is a pressure in brake fluid associated with the brake pedal or a position of the brake pedal.

4. The inching system according to claim 1, wherein the controller is configured to control the electric current to control the electrohydraulic valve to reduce the pressure of the hydraulic fluid at the pilot pressure port over a selected range of movement of the brake pedal.

5. The inching system according to claim 1, wherein the controller is configured to control the electric current to control the electrohydraulic valve to control the pressure of the hydraulic fluid at the pilot pressure port so that the inching starting point repeatedly occurs at a selected operator input.

6. The inching system according to claim 1, wherein the sensor is a position sensor sensing an angular movement of the brake pedal.

7. The inching system according to claim 1, wherein the sensor is a position sensor sensing a displacement movement of the brake pedal.

8. The inching system according to claim 1, wherein the sensor is a pressure sensor that senses a hydraulic pressure of brake fluid due to the operator depressing the brake pedal.

9. The inching system according to claim 1, wherein the controller is configured to fully open the electrohydraulic valve when the sensor detects a movement of the brake pedal beyond a preselected value and service brakes are engaged by the brake pedal as the movement of the brake pedal exceeds the preselected value.

10. The inching system according to claim 1, wherein a selected position of the brake pedal or a selected pressure applied to the brake pedal repeatedly results in a predetermined amount of torque to the ground engaging devices from the hydrostatic transmission.

11. The inching system according to claim 1, wherein the controller is configured to control the electric current to control the electrohydraulic valve based upon the signal and the engine speed when the signal indicates that at least a preselected first pressure is applied to the brake pedal without service brakes being engaged, the preselected first pressure corresponding to the inching starting point.

12. The inching system according to claim 11, wherein the controller is further configured to stop controlling the electric current to control the electrohydraulic valve based upon the signal when the signal indicates that at least a preselected second pressure is applied to the brake pedal, the preselected second pressure being higher than the preselected first pressure, the preselected second pressure corresponding to the inching ending point.

13. The inching system according to claim 1, wherein the controller is further configured to control the electric current to control the electrohydraulic valve based upon the signal and the engine speed when the signal indicates that the brake pedal is at least at a preselected first position without service brakes being engaged, the preselected first position corresponding to the inching starting point.

14. The inching system according to claim 13, wherein the controller is further configured to stop controlling the electric current to control the electrohydraulic valve based upon the signal when the signal indicates that the brake pedal is at least at a preselected second position, the preselected second position reflecting a further movement of the brake pedal than for the preselected first position, the preselected second position corresponding to the inching ending point.

15. A work vehicle comprising:
   ground engaging devices;
   a hydrostatic transmission configured for providing rotational power to the ground engaging devices, the hydrostatic transmission having hydraulic fluid and a pilot pressure port, wherein a pressure of the hydraulic fluid at the pilot pressure port controls a level of the rotational power from the hydrostatic transmission, and wherein a beginning of draining of the hydraulic fluid from the pilot pressure port defines an inching starting point;
   brakes,
   an engine configured for driving a hydraulic pump that supplies the hydraulic fluid within the hydrostatic transmission; and
   an inching system comprising:
      a brake pedal operable by an operator to activate the brakes of the work vehicle;
      an electrohydraulic valve hydraulically coupled to the pilot pressure port of the hydrostatic transmission, the electrohydraulic valve being configured to drain the hydraulic fluid at the pilot pressure port;

a sensor coupled to the brake pedal to detect an input from the operator, the sensor configured to produce a signal indicative of the input from the operator; and a controller configured to receive the signal and an engine speed of the engine, the controller being further configured to control an electric current to control the electrohydraulic valve based upon the signal and the engine speed so that the inching starting point and an inching ending point do not change as the engine speed changes, the inching ending point being defined by an ending of the draining of the hydraulic fluid from the pilot pressure port.

* * * * *